US009243337B2

(12) United States Patent
Turek et al.

(10) Patent No.: US 9,243,337 B2
(45) Date of Patent: Jan. 26, 2016

(54) OXYGEN-CONSUMING ELECTRODE WITH MULTILAYER CATALYST COATING AND PROCESS FOR THE PRODUCTION THEREOF

(75) Inventors: Thomas Turek, Goslar (DE); Imad Moussallem, Clausthal-Zellerfeld (DE); Andreas Bulan, Langenfeld (DE); Norbert Schmitz, Engelskirchen (DE); Peter Weuta, Leverkusen (DE)

(73) Assignee: Covestro Duetschland AG, Monheim (DE)

( * ) Notice: Subject to any disclaimer, the term of this patent is extended or adjusted under 35 U.S.C. 154(b) by 550 days.

(21) Appl. No.: 13/158,501

(22) Filed: Jun. 13, 2011

(65) Prior Publication Data
US 2012/0052402 A1 Mar. 1, 2012

(30) Foreign Application Priority Data
Jun. 16, 2010 (DE) .......................... 10 2010 024 053

(51) Int. Cl.
*C25B 11/03* (2006.01)
*H01M 4/66* (2006.01)
*H01M 4/86* (2006.01)
*H01M 4/88* (2006.01)
*H01M 4/90* (2006.01)
*H01M 8/00* (2006.01)
*H01M 12/04* (2006.01)

(52) U.S. Cl.
CPC ............. *C25B 11/035* (2013.01); *H01M 4/661* (2013.01); *H01M 4/662* (2013.01); *H01M 4/8642* (2013.01); *H01M 4/8668* (2013.01); *H01M 4/886* (2013.01); *H01M 4/8846* (2013.01); *H01M 4/8882* (2013.01); *H01M 4/8896* (2013.01); *H01M 4/90* (2013.01); *H01M 8/00* (2013.01); *H01M 12/04* (2013.01); *Y02E 60/50* (2013.01)

(58) Field of Classification Search
CPC ............. H01M 4/8642; H01M 4/8668; H01M 4/8657; H01M 4/8652; H01M 4/90; H01M 4/9058; H01M 4/661; H01M 8/083; H01M 12/04; H01M 2004/86; C25B 11/0478; C25B 11/0484; C25B 11/0405; Y02E 60/50; Y02E 60/128
USPC .......................... 429/523, 529, 532, 534, 405; 204/290.01, 290.08; 427/115
See application file for complete search history.

(56) References Cited

U.S. PATENT DOCUMENTS

| | | | |
|---|---|---|---|
| 3,793,084 A * | 2/1974 | Marchetto | ...................... 429/527 |
| 4,336,217 A | 6/1982 | Sauer | |
| 4,563,261 A | 1/1986 | Staab et al. | |
| 4,602,426 A | 7/1986 | Kampe et al. | |
| 4,603,118 A | 7/1986 | Staab | |
| 5,104,497 A | 4/1992 | Tetzlaff et al. | |
| 5,584,976 A | 12/1996 | Nishiki et al. | |
| 6,117,286 A | 9/2000 | Shimamune et al. | |
| 6,165,332 A | 12/2000 | Gestermann et al. | |
| 2006/0263232 A1 | 11/2006 | Bulan | |

FOREIGN PATENT DOCUMENTS

| | | | | |
|---|---|---|---|---|
| DE | 2021009 | * | 2/1971 | ............ H01M 27/04 |
| DE | 2941774 A1 | | 4/1981 | |
| DE | 3332566 A1 | | 3/1985 | |
| DE | 3401636 A1 | | 7/1985 | |
| DE | 3710168 A1 | | 10/1988 | |
| DE | 19622744 C1 | | 7/1997 | |
| EP | 115845 A2 | | 8/1984 | |
| EP | 1033419 A1 | | 9/2000 | |
| EP | 1728896 A2 | | 12/2006 | |
| WO | WO-01/57290 A1 | | 8/2001 | |
| WO | WO-2008/006909 A2 | | 1/2008 | |

OTHER PUBLICATIONS

Bidault, F., et al., "An improved cathode for alkaline fuel cells," International Journal of Hydrogen Energy (2010), vol. 35, pp. 1783-1788.
Lipp, L., et al., "Peroxide formation in a zero-gap chlor-alkali cell with an oxygen-depolarized cathode," Journal of Applied Electrochemistry (2005), vol. 35, pp. 1015-1024.
Moussallem, I., et al., "Chlor-alkali electrolysis with oxygen depolarized cathodes: history, present status and future prospects," J Appl Electrochem (2008), vol. 38, pp. 1177-1194.
Staab, Ru., "Alkalichlorid-Elektroyse mit Sauerstoff-Verzehrkathode—ein Verfahern zur Energie-Einsparung", Chemie Ingenieur Technik, vol. 59, No. 4, (1987), pp. 316-319.
European Search Report for Application No. 11169579.7 dated Mar. 27, 2014.

* cited by examiner

Primary Examiner — Raymond Alejandro
(74) Attorney, Agent, or Firm — Drinker Biddle & Reath LLP

(57) ABSTRACT

A multilayer oxygen consuming electrode having a side facing the oxygen-containing gas and a side facing the alkaline electrolyte, wherein the electrode includes at least one support, and at least two layers containing a catalyst and a hydrophobic material, wherein the outermost layer facing the gas side has a lower proportion of catalyst than the outermost layer facing the electrode side and wherein the proportion of hydrophobic material is not more than 8% by weight based on the total amount of the catalyst the hydrophobic material.

13 Claims, No Drawings

OXYGEN-CONSUMING ELECTRODE WITH MULTILAYER CATALYST COATING AND PROCESS FOR THE PRODUCTION THEREOF

CROSS-REFERENCE TO RELATED APPLICATIONS

This application claims benefit to German Patent Application No. 10 2010 024 053.2, filed Jun. 16, 2010, which is incorporated herein by reference in its entirety for all useful purposes.

BACKGROUND OF THE INVENTION

The invention proceeds from oxygen-consuming electrodes known per se which are configured as sheet-like gas diffusion electrodes and usually comprise an electrically conductive support and a gas diffusion layer having a catalytically active component.

Various proposals for the operation of oxygen-consuming electrodes in electrolysis cells on an industrial scale are fundamentally known from the prior art. The basic idea is to replace the hydrogen-evolving cathode of the electrolysis (for example in chloralkali electrolysis) by the oxygen-consuming electrode (cathode). An overview of possible cell designs and solutions may be found in the publication by Moussallem et al., "Chlor-Alkali Electrolysis with Oxygen Depolarized Cathodes: History, Present Status and Future Prospects", J. Appl. Electrochem. 38 (2008) 1177-1194.

The oxygen-consuming electrode, hereinafter also referred to as OCE for short, has to meet a series of requirements in order to be able to be used in industrial electrolysers. Thus, the catalyst and all other materials used have to be chemically stable to sodium hydroxide solution having a concentration of about 32% by weight and to pure oxygen at a temperature of typically 80-90° C. A high degree of mechanical stability is likewise required, since the electrodes are installed and operated in electrolysers having an electrode area of usually more than 2 m$^2$ (industrial size). Further properties are: a high electrical conductivity, a low layer thickness, a high internal surface area and a high electrochemical activity of the electrocatalyst, and also impermeability so that gas and liquid spaces remain separated from one another. The long-term stability and low production costs are further particular requirements which an industrially usable oxygen-consuming electrode has to meet.

The invention relates in particular to an oxygen-consuming electrode which is built up in a plurality of layers and which has a difference in respect of the catalyst or PTFE concentration between the gas side and the electrolyte side and can be produced by the wet process.

Oxygen-consuming cathodes according to the prior art are used in various arrangements in electrochemical processes, for example in the generation of power in fuel cells or in the electrolytic preparation of chlorine from aqueous solutions of sodium chloride. A detailed description of chloralkali electrolysis using oxygen-consuming cathodes may be found in Journal of Applied Electrochemistry, Vol 38 (9), pages 1177-1194 (2008). Examples of electrolysis cells having oxygen-consuming cathodes may be found in the documents EP 1033419B1, DE 19622744C1 and WO 2008006909A2.

An oxygen-consuming cathode typically consists of a support element, for example a plate composed of porous metal or a woven mesh composed of metal wires, and an electrochemically active coating (DE 3710168). The electrochemically active coating is porous and consists of hydrophilic and hydrophobic constituents. The hydrophobic constituents make the penetration of electrolytes difficult and thus keep the appropriate pores free for transport of the oxygen to the catalytically active sites. The hydrophilic constituents allow penetration of the electrolyte to the catalytically active sites and the outward transport of the hydroxide ions. As hydrophobic component, use is made of, for example, polytetrafluoroethylene (PTFE). Hydrophobic surfaces usually have a contact angle of more than 140° on wetting with pure water.

In the manufacture of oxygen-consuming cathodes, a distinction can be made in principle between dry and wet manufacturing processes.

In the dry processes, a powder mixture of catalyst and polymeric component (e.g. PTFE) is produced (e.g. as described in DE 2941774) and milled to particles which are subsequently distributed on an electrically conductive support element and pressed at room temperature. Such a process is described, for example, in EP 1728896A2. Silver-oxide/silver is mentioned as preferred catalyst, polytetrafluoroethylene (PTFE) is mentioned as binder and a gauze made of nickel wires is mentioned as support.

In the case of wet manufacturing processes, either a paste or a suspension consisting of catalyst and polymeric component in a dispersion medium, preferably water, is used. To produce the suspension, it is possible to add additional surface-active substances in order to increase the stability of the suspension or paste. To improve the processability, a thickener can be added to the suspension. The paste is subsequently applied by screen printing or calendering to a current distributor, while the less viscous suspension is usually sprayed on.

The paste or suspension is dried gently after removal of excess dispersion medium and pressed at temperatures in the region of the melting point of the polymer (Journal of Applied Electrochemistry, Vol 38 (9) pages 1177-1194 (2008)). The oxygen-consuming cathodes can consist of a single layer applied to a support. The support can in this case take on a number of tasks, firstly provision of the mechanical stability of the finished OCC and/or distribution of the current within the catalytically active layer.

However, the known single-layer electrodes have the disadvantage that they are sensitive to breakthrough of liquid or gas. This is of critical importance especially in industrial electrolysers. Here, gas must not get from the gas space into the electrolyte space, and electrolyte must not get from the electrolyte space into the gas space. In industrial electrolysers, the oxygen-consuming cathode must withstand the hydrostatic pressure prevailing at the bottom of the industrial electrolysis cell of, for example, 170 mbar. Since a gas diffusion electrode has a pore system, a small amount of liquid always gets into the gas space and gas gets into the liquid space. The amount depends on the cell design of the electrolyser. The OCC should be gas-impermeable/liquid-impermeable at a pressure difference between the gas space and the liquid space of 10-60 mbar. Here, gas-impermeable means that no entry of gas bubbles into the electrolyte space can be observed with the naked eye. Liquid-impermeable means that an amount of liquid of not more than 10 g/(h*cm$^2$) goes through the OCC (where g is the mass of liquid, h is one hour and cm$^2$ is the geometric electrode surface area).

However, if too much liquid gets through the OCC, this can flow downwards only on the side facing the gas side. This can result in formation of a liquid film which hinders access of the gas to the OCC and thereby has an extremely adverse effect on the performance of the OCC (undersupply of oxygen). If too much gas gets into the electrolyte space, the gas bubbles have to be able to be discharged from the electrolyte space. In any case, the gas bubbles cover part of the electrode area and the membrane area, which leads to a shift in power density and thus in galvanostatic operation of the cell to a local increase in the current density and an undesirable increase in cell voltage over the cell.

Single-layer oxygen-consuming cathodes which satisfy this requirement profile have not been known hitherto. To operate the available oxygen-consuming cathodes in an industrial electrolyser, the cell design has hitherto been adapted to the deficiencies of the oxygen-consuming cathode. For example, electrolysers having pressure compensation, as described in DE 19622744C1, which compensate for the hydrostatic height of the liquid upstream of the electrode by dividing the gas space by means of gas pockets, with a gas pressure adapted to the hydrostatic pressure being set in each gas pocket, have been developed. However, these have the disadvantage that, apart from the high costs and use of material in construction of the cell, electrode area is also lost and a larger number of electrolysis elements or more electrode area is required to achieve the same power of the electrolysis cell.

It has been found that single-layer OCC produced by the wet process, in particular, cannot be used in industrial electrolysers because of unsatisfactory gas-impermeability and electrolyte-impermeability.

Multilayer oxygen-consuming cathodes can fundamentally be produced by the dry or wet pasting process. According to EP 1728896, multilayer oxygen-consuming cathodes are produced by the dry process. Here, powder layers in which the PTFE content varies from 3 to 15% by weight are produced. No information is given about the arrangement of the layers having a differing PTFE content. A disadvantage of the process described is that the layers cannot be made arbitrarily thin. A consequence of this is that a multilayer oxygen-consuming cathode having this structure would be relatively thick, which leads to an increased cell voltage during electrolysis and incurs high production costs due to the increased amount of material.

U.S. Pat. No. 4,602,4261 likewise discloses a multilayer oxygen-consuming cathode produced by the dry process. The best two-layer electrode disclosed has a thickness of at least 0.89 mm. PTFE contents disclosed are in the range from at least 10% by weight to 50% by weight. Such high PTFE contents can lead to the active catalyst particles not forming an electrically conductive network in the electrode and therefore the total amount of catalyst material is no longer available for the electrochemical reaction. This reduces the efficiency of the electrolysis cell and thus increases the cell voltage.

U.S. Pat. No. 5,584,976 discloses a multilayer oxygen-consuming cathode which is produced by applying layers to both sides of a silver substrate. Here, the outermost layer facing the gas side is made completely of a hydrophobic material; a pure, porous PTFE layer is disclosed here. The cell voltages disclosed for these multilayer oxygen-consuming cathodes are in the range from 2.3 to 2.4 V (at a current density of 3 $kA/m^2$) and are therefore very high.

It is common to all these multilayer oxygen-consuming cathodes that either the PTFE contents in the hydrophobic layers are relatively high and thus lead to high cell voltages or the production processes lead to thick electrodes and thus likewise to relatively high cell voltages.

Particularly when the side facing the gas side has a high PTFE content, the electrode cannot be used in particular cell constructions. Thus, for example, the contacting of the OCC in the falling film cell technology (DE 3401636A1 or WO 0157290A1) is effected from the gas side by means of an elastic mat or similar constructions. However, at high PTFE contents, the electrical conductivity of the layer increases greatly, so that either there is a higher ohmic resistance, which leads to a higher cell voltage, or contacting is not possible at all, as a result of which the installation of the OCC in the electrolysis cell is very complicated.

Bidault et al. (2010, Int. J. of Hydrogen Energy, "An improved Cathode for alkaline fuel cells", 35, pp. 1783-1788) have been able to show in studies that the thickness of the oxygen-consuming cathode can have a very great influence on the overall performance of the electrode. In measurements using two-layer electrodes on a nickel foam, the layer facing the anode consisted of plated-on silver. The layer facing the gas space consisted of a porous carbon/PTFE mixture. These electrodes showed that lowering the thickness from 0.7 mm to 0.5 mm made it possible to improve the half-cell potential by 100 mV. Layer thicknesses of less than 0.5 mm in the two-layer construction used here lead to electrodes which are not sufficiently electrolyte-impermeable and in which electrolyte breakthrough into the gas space occurs.

BRIEF SUMMARY OF THE INVENTION

The invention relates to an oxygen-consuming electrode for the reduction of oxygen in an alkaline medium having a novel multilayer catalyst coating and also an electrolysis apparatus. The invention further relates to a production process for the oxygen-consuming electrode and its use in chloralkali electrolysis or in fuel cells.

It was an object of the present invention to produce a multilayer oxygen-consuming cathode which has a low thickness and achieves the required hydrophobicity, as a result of which high impermeability in respect of liquid and gas breakthrough can be achieved and electrical contacting from the gas side is made possible.

A possible way of overcoming the disadvantages known from the prior art is the multilayer structure of the oxygen-consuming cathode.

An embodiment of the invention provides a multilayer sheet-like oxygen-consuming electrode for the reduction of oxygen in an aqueous alkaline medium, which comprises at least one support which is, in particular, electrically conductive, a layer containing a catalyst and a hydrophobic layer, where the electrode has a side facing the oxygen-containing gas and a side facing the alkaline electrolyte, which is characterized in that the electrode has at least two different layers containing the catalyst which have a differing catalyst content and in which the outermost layer facing the gas side has a lower proportion of catalyst than the outermost layer facing the electrolyte side and the proportion of hydrophobic material in the hydrophobic layer is not more than 8% by weight.

Another embodiment is a multilayer oxygen consuming electrode having a side facing the oxygen-containing gas and a side facing the alkaline electrolyte, wherein the electrode comprises at least one support, and at least two layers comprising a catalyst and a hydrophobic material, wherein the outermost layer facing the gas side has a lower proportion of catalyst than the outermost layer facing the electrode side and wherein the proportion of hydrophobic material is not more than 8% by weight based on the total amount of the catalyst the hydrophobic material.

Yet another embodiment of the present invention is a process for producing an oxygen-consuming electrode comprising a) producing at least two suspensions by dispersing or mixing the components comprising particles of a catalytically active substance, a dispersion medium, and particles of a hydrophobic polymer, wherein the at least two suspensions have a different proportion of hydrophobic polymer, b) spraying the at least two suspensions in one or more steps onto a support to produce at least two layers comprising a catalyst at different proportions, wherein the support has been heated to a temperature in the range from 100° C. to 160° C. thereby at least partially removing the dispersion medium, c) hot pressing the electrode obtained after step b) under a pressure from 0.04 to 0.4 t/cm$^2$ and at a temperature from 60 to 200° C., d) subsequently sintering the electrode at a temperature of at least 200° C.

Yet another embodiment of the present invention is a chloralkali electrolysis apparatus containing an oxygen-consuming electrode according to any embodiment described herein as an oxygen-consuming cathode.

Yet another embodiment of the present invention is a fuel cell containing an oxygen-consuming electrode according any embodiment described herein.

Yet another embodiment of the present invention is a metal/air battery containing an oxygen-consuming electrode according any embodiment described herein.

The novel multilayer oxygen-consuming electrodes are more impermeable in respect of gas or electrolyte breakthrough than the known OCEs. The approach to achieve the technical solution here is to make a layer or coating hydrophobic so that the electrolyte does not penetrate into the pores there. A further layer is made hydrophilic so that the electrolyte and thus the reactant water can penetrate to the catalyst and the electrochemical reaction can take place. This ensures that although liquid can penetrate into the electrode on one side, it cannot break through the electrode to the gas side. At the same time, it is ensured that the gas can likewise penetrate in but cannot break through to the electrolyte side.

DETAILED DESCRIPTION OF THE INVENTION

A preferred oxygen-consuming electrode is characterized in that the catalyst contains silver as catalytically active component.

A preferred embodiment of the multilayer oxygen-consuming electrode is characterized in that at least two catalyst-containing layers are present and the layer on the side facing the gas side has a catalyst content of from 92 to 98% by weight and the layer facing the electrolyte side has a catalyst content of from 95 to 99.9% by weight, where the balance of the catalyst layer to 100% is based on a hydrophobic polymer.

A particularly preferred embodiment of the oxygen-consuming electrode is characterized in that at least three catalyst-containing layers are present and the outermost layer facing the gas side has a catalyst content of from 92 to 98% by weight and the outermost layer facing the electrolyte side has a catalyst content of from 95 to 99.9% and in that a middle layer which has a catalyst content greater than that of the outermost layer facing the gas side and less than that of the outermost layer facing the electrolyte side is present.

In a preferred embodiment of the invention, the hydrophobic layer comprises a hydrophobic polymer, in particular a fluorine-substituted polymer, preferably PTFE.

A particular variant of the oxygen-consuming electrode is characterized in that the electrode has a total loading of catalytically active component in the range from 100 mg/cm$^2$ to 300 mg/cm$^2$, preferably from 140 mg/cm$^2$ to 250 mg/cm$^2$.

The support of the oxygen-consuming electrode is advantageously based on nickel, silver or a combination of nickel and silver.

In particular, the support of the oxygen-consuming electrode is in the form of a gauze, woven fabric, formed-loop knit, drawn-loop knit, nonwoven or foam, preferably a woven fabric.

The thickness of the novel oxygen-consuming electrode is preferably from 0.2 to 0.8 mm and the thickness of the catalyst-containing layers is not more than 0.4 mm.

The OCC of the invention can be produced by a wet pasting or spray process which makes it possible for layers having different properties, i.e. different and very low PTFE contents, to be applied in a targeted way and at the same time leads to electrodes which can be operated in electrolysis cells at a very low cell voltage.

Electrodes which can be obtained by the wet process are generally produced by the following steps:
1. production of a suspension/paste of catalyst and PTFE, optionally thickeners, stabilizers and surfactants
2. application of the suspension/paste to a support
3. drying, optional sintering
4. optional repetition of steps 2 and 3
5. optional compacting of the OCC from step 4, optionally at elevated temperature
6. sintering The invention further provides a process for producing a novel oxygen-consuming electrode by a) producing at least two suspensions by dispersing or mixing the components consisting of at least particles of a catalytically active substance, preferably silver particles, and a dispersion medium, preferably an organic solvent or water, particularly preferably water, and particles of a hydrophobic polymer having a differing proportion of hydrophobic polymers, b) spraying the suspensions in one or more steps onto a support to produce the varying layers, preferably a nickel support, where the support has been heated to a temperature in the range from 100° C. to 160° C., preferably from 100° C. to 145° C., with at least partial removal of the dispersion medium, c) hot pressing the electrode obtained after step b), in particular under a pressure in the range 0.1-3 t/cm$^2$, preferably in the range 0.1-0.25 t/cm$^2$, and at a temperature in the range from 110° C. to 140° C., particularly preferably at 130° C., d) subsequently sintering the electrode at a temperature of at least 200° C., preferably at least 250° C., particularly preferably at least 300° C.

Preference is therefore also given to a novel oxygen-consuming electrode as described above which is characterized in that the layers containing the catalyst have been produced by applying a suspension containing silver particles to the support, drying the suspension, hot pressing the layers and subsequently sintering the electrode formed.

In a particularly preferred variant of the process, the silver which is used in powder form for the suspension has a particle size distribution of the silver particles which has a $D_{90}$ of <8 μm and a $D_{10}$ of <1 μm. (Determined as described by Stiess, "Mechanische Verfahrenstechnik—Partikeltechnologie 1", 2009, 3rd edition, Springer-Verlag, page 32 ff.)

The tapped density of the silver particles for the suspension is particularly preferably in the range from 2 to 6 g/cm$^3$, preferably from 3 to 5 g/cm$^3$, DIN ISO 3953

The average surface area of the silver powder used in the novel process as determined by the BET method is very particularly preferably in the range from 0.3 to 2.5 m²/g, preferably from 0.50 to 1.5 m²/g.

For example, it is possible to use silver powders of the grades SF9ED, 331, 311 from Ferro (Hanau) or the catalysts described in EP 115845 A2 in which silver has been precipitated onto PTFE. Different silver powders can be used in the different layers. Here, the layers can have different PTFE contents.

The catalyst is, for example, mixed with a suspension containing a hydrophobic polymer, e.g. a commercial PTFE suspension. To stabilize and thicken the suspension, a methylcellulose, for example, is added. The methylcellulose content of the suspension is, for example, 0.5%. As an alternative, polyvinyl alcohol (PVA) and polyacrylate (PA) have been found to be useful as preferred thickener.

The suspension can further comprise a detergent. Detergents are, for instance, ionic or nonionic surfactants, for instance the materials generally known under the trade name family TWEEN or the materials known under the trade name family TRITON. Preference is given to using a detergent and this is particularly preferably TRITON-X 100.

The electrode is, for example, produced by applying the suspension to a support, e.g. a nickel gauze, a silver-plated nickel gauze or a silver gauze. This can be achieved by means of a spray process or by means of a doctor blade process or Kisscoater process or other customary processes such as screen printing. The different layers of the electrode of the invention are built up with one layer firstly being applied to the support. This middle layer has, for example, a PTFE content of from 2 to 8% by weight.

This middle layer is given such a thickness that the support no longer has any gaps. From 20 to 80% of the catalyst loading of the electrode is usually incorporated in this layer.

If a support consisting of a nickel gauze whose mesh opening is only small is used, few cycles of spraying-on and drying are required to produce an impermeable electrode.

Subsequently, a suspension is preferably applied to the side of the electrode facing the electrolyte in such an amount that removal of the solvent leaves a PTFE content of from 0.2 to 5% by weight, preferably from 0.5-2% by weight. This layer can be made appropriately thin. The loading amount is usually from 2 to 40% by weight of the catalyst loading of the total electrode.

A PTFE content of from 2 to 8% by weight is particularly preferably produced on the side of the electrolyte facing the gas side. The loading amount is usually from 2 to 40% by weight of the catalyst loading of the total electrode.

The loading of the total electrode is preferably at least 100 mg of silver/cm², particularly preferably from 140 mg/cm² to 250 mg/cm²; higher loadings give no further advantage in terms of the performance in respect of cell voltage and impermeability to gas and liquid.

The layers which have been applied in this way are particularly advantageously applied to a support while this is being heated or is resting on a heated substrate. The temperature is, in particular, more than 60° C. and should particularly preferably be greater than 100° C. (when aqueous dispersions are employed) and should preferably be not more than 200° C.

After the electrode has been finished, it is firstly pressed before the electrode is sintered. This can be effected by means of a pressing tool, e.g. a hydraulic punch or by compacting by means of a roller. If pressing is carried out by means of a hydraulic punch, the pressing force is preferably from a minimum of 0.04 t/cm² to not more than 0.4 t/cm², preferably from 0.08 to 0.3 t/cm². Pressing can, in particular, be carried out at elevated temperature, e.g. a temperature of from 60 to 200° C., preferably from 80 to 150° C.

After pressing, the electrode is sintered. Sintering is preferably carried out at a temperature of at least 200° C., preferably at least 250° C., particularly preferably at least 300° C. and in particular up to 400° C. Sintering is particularly advantageous because it enables the residual amounts of any thickener and/or detergent used to be removed. Thus, these materials cannot remain as residue in the electrode or as film on the surface and thereby impair the performance of the OCC, e.g. by increasing the ohmic resistance of the electrode. Likewise, the fluorinated polymers which are preferably used usually have no significant vapour pressure at these temperatures or do not yet decompose to an appreciable extent at these temperatures, so that they merely soften and together with the metal powder give a stabilizing film.

The sintering process can, for example, be carried out by heating the electrode in one operation from room temperature to the intended temperature of about 340° C. at at least 2K/min. A ramp-like temperature increase with residence times at particular temperature levels is likewise possible. To achieve the temperature of from 300 to 350° C., preferably from 330 to 345° C., the electrode is, for example, heated as follows: from room temperature the electrode is heated at a temperature increase of from a minimum of 2° C./min to 200° C., then held for 15 min at the temperature, subsequently heated further at a temperature increase of from a minimum of 2° C./min to 250° C., subsequently held again for 15 min at the temperature and again heated at a minimum of 2° C./min to 300° C., held for 15 min and then heated at 2° C./min to the final temperature and likewise held there for 15 min. The electrode is subsequently cooled at from 10 to 200° C./min and is ready to use after cooling.

The process of the invention has made it possible to produce multilayer oxygen-consuming electrodes which firstly have a high stability to breakthrough of liquid or gas and secondly have low cell voltages in the region of 2.0 V at 4 kA/m².

The oxygen-consuming electrode of the invention can be used, for example, in chloralkali electrolysis in cells having an alkali gap between oxygen-consuming electrode and ion-exchange membrane or in direct contact with the ion-exchange membrane or in cells having a hydrophilic material in the gap between ion-exchange membrane and oxygen-consuming electrode, comparable to the process described in U.S. Pat. No. 6,117,286 A1.

The novel oxygen-consuming electrode is preferably connected as cathode, in particular in an electrolysis cell for the electrolysis of alkali metal chlorides, preferably sodium chloride or potassium chloride, particularly preferably sodium chloride.

As an alternative, the oxygen-consuming electrode can preferably be connected as cathode in a fuel cell. A preferred example of such a fuel cell is the alkaline fuel cell.

The invention therefore further provides for the use of the novel oxygen-consuming electrode for the reduction of oxygen in an alkaline medium, in particular as oxygen-consuming cathode in electrolysis, in particular in chloralkali electrolysis, or as electrode in a fuel cell or as electrode in a metal/air battery.

The novel OCE is particularly preferably used in chloralkali electrolysis and here especially in the electrolysis of sodium chloride (NaCl).

The invention further provides an electrolysis apparatus, in particular for chloralkali electrolysis, which has a novel oxygen-consuming electrode as described above as oxygen-consuming cathode.

The invention is illustrated by the examples, without being restricted thereby.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Example 1

Production of an Oxygen-Consuming Cathode, 3-Layer, Catalyst Content 99% by Weight (Electrolyte Side), 98% by Weight (Middle), 97% by Weight (Gas Side)

An aqueous suspension consisting of a silver catalyst from Ferro, SF9ED, a PTFE suspension (TF5035R, 58 wt. %, Dyneon™), a nonionic surfactant (TRITON-X 100, Fluka Chemie AG) and hydroxyethylmethylcellulose (Walocel MKX 70000 PP 01, Wolff Cellulosics GmbH & Co. KG) as thickener was produced with various contents of silver and PTFE. The production of the suspension having a silver content of 97% by weight and a PTFE content of 3% by weight is carried out by weighing out appropriate amounts. The production of the suspension having a silver content of 98% by weight and 99% by weight was carried out analogously. 90 g of silver powder, 53.7 g of water and 1.5 g of surfactant were added to 150 g of the thickening solution (1% by weight of methylcellulose in water). After dispersion of the suspension in a rotor-stator system (Ultra-Turrax T25 with the dispersing unit S25N-25F, IKA) at 13 500 min-1 for 5 minutes (with 2 minutes pause between in each case dispersing for 1 minute in order to avoid excessive heating of the solution), 4.8 g of PTFE solution were added slowly while stirring in order to avoid agglomeration.

The suspensions produced in this way were then sprayed a number of times on a nickel gauze (manufacturer: Haver & Boecker, 106×118 μm gauze, 63 μm wire thickness). The loading was selected so that 50% of the catalyst loading was applied in the middle and in each case 25% of the catalyst loading was applied on the electrode side and on the gas side of the electrode. During spraying, the nickel gauze was maintained at a temperature of 100° C. After the desired total loading of 170 g/cm$^2$ of catalyst had been achieved, the electrode was fixed between two metal plates and hot pressed at a temperature of 130° C. and a pressure of 0.14 t/cm$^2$. The electrode was subsequently heated in air at 3 K/min and sintered at 340° C. for 15 minutes.

The oxygen-consuming cathode (OCC) produced in this way was used in the electrolysis of a sodium chloride solution using an N982WX ion-exchange membrane from DuPONT. The cell voltage at a current density of 4 kA/m$^2$, an electrolyte temperature of 90° C., a sodium hydroxide solution gap between OCC and ion-exchange membrane of 3 mm and a sodium hydroxide concentration of 32% by weight was 2.09 V. The electrolyte displayed no oxygen breakthrough to the electrolyte side up to an oxygen pressure of 200 mbar and no alkali breakthrough to the gas side up to a hydrostatic height of 1 m. A commercial noble metal-coated titanium electrode for chloralkali electrolysis (manufacturer Denora) was used as anode.

Example 2

Oxygen-Consuming Cathode Single-Layer with Various Silver Contents: a) 93% by Weight, b) 97% by Weight, c) 98% by Weight (Comparative Examples)

Three single-layer oxygen-consuming cathodes were produced by the process described in Example 1. However, only one dispersion having a content of a) 93% by weight, b) 97% by weight or c) 98% by weight of silver based on the remaining solids was used. All three electrodes displayed a cell voltage increased by 100 mV and severe gas breakthrough at 200 mbar of oxygen and liquid breakthrough at a hydrostatic height of 1 m in the electrolysis of a sodium chloride solution under the conditions described in Example 1.

Example 3

Oxygen-Consuming Cathode, Two-Layer, Catalyst Content: 1st Layer (Facing the Electrolyte) 99%, 2nd Layer (Facing the Gas Side) 88% (Comparative Example)

A two-layer oxygen-consuming cathode was produced by the process described in Example 1, but using only two dispersions having different proportions of catalyst, resulting in a catalyst content of 99% by weight in the layer facing the electrolyte and of 88% by weight in the layer facing the gas. Here, a 120 mV higher cell voltage was obtained in the electrolysis of a sodium chloride solution under the conditions described in Example 1.

The invention claimed is:

1. A multilayer oxygen-consuming electrode having a gas side facing oxygen-containing gas and an electrolyte side facing alkaline electrolyte, wherein the electrode comprises
   at least one support, and
   at least two layers, a layer on the side facing the gas side and a layer facing the electrolyte side, which comprise a catalyst and a hydrophobic material, wherein the layer on the side facing the gas side comprises from 92 to 98% by weight of the catalyst and from 2 to 8% by weight of the hydrophobic material and the layer facing the electrolyte side comprises from 95 to 99.9% by weight of the catalyst and from 0.1 to 5% by weight of the hydrophobic material, and wherein the layer facing the gas side has a lower proportion of catalyst than the layer facing the electrolyte side and wherein the proportion of hydrophobic material is not more than 8% by weight based on the total amount of the catalyst and the hydrophobic material, wherein the catalyst comprises a catalytically active component and wherein the electrode has a total loading of the catalytically active component from 140 to 250 mg/cm$^2$.

2. The oxygen-consuming electrode according to claim 1, wherein the catalyst comprises silver as a catalytically active component.

3. The oxygen-consuming electrode according to claim 1, wherein the at least two layers comprising the catalyst and a hydrophobic material are produced by applying a suspension comprising silver particles to the support, drying the suspension, hot pressing the at least two layers to form an electrode and subsequently sintering the electrode formed.

4. The oxygen-consuming electrode according to claim 3, wherein the silver particles are in powder form for the suspension and have a particle size distribution of $D_{90}$ of less than 8 μm and $D_{10}$ of less than 1 μm.

5. The oxygen-consuming electrode according to claim 3, wherein the silver particles have a tapped density from 2 to 6 g/cm$^3$.

6. The oxygen-consuming electrode according to claim 4, wherein the silver particles have an average surface determined by the BET method from 0.3 to 2.5 m$^2$/g.

7. The oxygen-consuming electrode according to claim 1, wherein at least three layers comprising the catalyst are present and the layer facing the gas side comprises from 92 to 98% by weight of the catalyst and the layer facing the electrolyte side comprises from 95 to 99.9% of the catalyst, and a middle layer comprises a catalyst content greater than that of the layer facing the gas side and less than that of the layer facing the electrolyte side.

8. The oxygen-consuming electrode according to claim 1, wherein the hydrophobic material comprises a hydrophobic polymer.

9. The oxygen-consuming electrode according to claim 1, wherein the hydrophobic material is polytetrafluoroethylene.

10. The oxygen-consuming electrode according to claim 1, wherein the support is based on a material selected from the group consisting of nickel, silver, and a mixture thereof.

11. The oxygen-consuming electrode according to claim 1, wherein the support is selected from the group consisting of gauze, woven fabric, formed-loop knit, drawn-loop knit, non-woven and foam.

12. The oxygen-consuming electrode according to claim 1, wherein the electrode has a thickness from 0.2 to 0.8 mm.

13. The oxygen-consuming electrode according to claim 1, wherein the multilayer oxygen-consuming electrode when operated in an electrolyses cell has a cell voltage of about 2.0 V at 4 kA/m$^2$.

* * * * *